United States Patent
Han et al.

(10) Patent No.: US 11,220,158 B2
(45) Date of Patent: Jan. 11, 2022

(54) VEHICLE WITH THERMAL COMFORT SENSOR FOR CABIN CLIMATE CONTROL

(71) Applicant: GM Global Technology Operations LLC, Detroit, MI (US)

(72) Inventors: Taeyoung Han, Bloomfield Hills, MI (US); Shailendra Kaushik, Novi, MI (US); Bahram Khalighi, Birmingham, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 492 days.

(21) Appl. No.: 16/217,484

(22) Filed: Dec. 12, 2018

(65) Prior Publication Data

US 2020/0189352 A1 Jun. 18, 2020

(51) Int. Cl.
*G01K 17/00* (2006.01)
*B60H 1/00* (2006.01)
(Continued)

(52) U.S. Cl.
CPC ..... *B60H 1/00742* (2013.01); *B60H 1/00285* (2013.01); *B60N 2/879* (2018.02);
(Continued)

(58) Field of Classification Search
CPC combination set(s) only.
See application file for complete search history.

(56) References Cited

U.S. PATENT DOCUMENTS

2013/0232996 A1* 9/2013 Goenka .............. B60N 2/56
62/3.61
2015/0360608 A1* 12/2015 Tzirkel-Hancock ... B60N 2/879
297/217.1
(Continued)

FOREIGN PATENT DOCUMENTS

CN 105059088 A * 11/2015 .......... G05B 19/042
CN 106364431 A 2/2017
(Continued)

OTHER PUBLICATIONS

EPO translation of FR2802470 (Year: 2001).*
EPO translation of CN-105059088 (Year: 2015).*

*Primary Examiner* — Lisa M Caputo
*Assistant Examiner* — Nasir U. Ahmed
(74) *Attorney, Agent, or Firm* — Quinn IP Law

(57) ABSTRACT

A vehicle a sensor system disposed adjacent to a headrest portion of a seat within a passenger compartment of the vehicle. The sensor system includes at least one of an air velocity sensor, an air temperature sensor, a radiant heat flux sensor, a heat flux sensor, or a humidity sensor. The sensor system is positioned near the headrest, facing a forward end of the vehicle, in a position that is not blocked by a head of a passenger seated in the seat. The sensor system provides data related to the air velocity, the air temperature, the radiant heat flux, the heat flux, or the relative humidity, enabling a climate controller to accurately calculate a current Equivalent Homogenous Temperature (EHT) of a passenger seated in the seat. The climate controller may then control a climate system of the vehicle based on the calculated EHT to provide a desired EHT.

19 Claims, 4 Drawing Sheets

(51) Int. Cl.
  *B60N 2/879* (2018.01)
  *G01K 17/20* (2006.01)
  *G01J 5/12* (2006.01)
  *G01J 5/00* (2006.01)
  *G01K 13/20* (2021.01)

(52) U.S. Cl.
  CPC ............... *G01J 5/0025* (2013.01); *G01J 5/12* (2013.01); *G01K 13/20* (2021.01); *G01K 17/20* (2013.01)

(56) References Cited

U.S. PATENT DOCUMENTS

| | | | |
|---|---|---|---|
| 2016/0089955 A1* | 3/2016 | Ham | B60H 1/00892 165/202 |
| 2016/0318468 A1* | 11/2016 | Ricci | G08B 21/0205 |
| 2018/0194307 A1* | 7/2018 | Han | B60N 2/56 |

FOREIGN PATENT DOCUMENTS

| | | | | |
|---|---|---|---|---|
| CN | 107310437 | A | 11/2017 | |
| CN | 107662472 | A | 2/2018 | |
| CN | 207711860 | A | 8/2018 | |
| CN | 208164819 | U | 11/2018 | |
| FR | 2802470 | A1 * | 6/2001 | ......... B60H 1/00742 |
| FR | 2802470 | A1 | 6/2001 | |

* cited by examiner

VEHICLE WITH THERMAL COMFORT SENSOR FOR CABIN CLIMATE CONTROL

INTRODUCTION

The disclosure generally relates to a vehicle having a climate control system, and a method of controlling the climate control system of the vehicle.

A climate control system for a vehicle may include many different vehicle systems and/or features that affect thermal comfort of a passenger. For example, the climate control system may include a heating system for heating a passenger compartment of the vehicle, an air conditioning system for cooling the passenger compartment, a ventilation system that provides a flow of ambient air to the passenger compartment, a system of controllable ductwork that directs and controls the flow of air through the passenger compartment, moveable windows and/or a sunroof, etc. The climate control system may be manually controlled by a passenger, or may be automatically controlled by a computer, e.g., a climate controller, based on a defined set-point or desired temperature input by the passenger.

Perceived temperatures within the passenger compartment of a vehicle are dependent upon both environmental factors and personal factors. The environmental factors may include an air velocity, an air temperature, a radiant heat flux, and a relative humidity. The environmental factors may be combined into a single temperature value, referred to as an Equivalent Homogenous Temperature (EHT). The EHT represents the thermal condition perceived by an individual. The personal factors may include a metabolic rate of an individual and the current clothing being worn by the individual. The personal factors may be combined with the environmental factors to define a Predicted Mean Vote (PMV) of thermal comfort. As is understood by those skilled in the art, the PMV of thermal comfort is an empirical fit to the human sensation of thermal comfort that predicts the average vote of a large group of people on a seven point thermal sensation scale between −3 (cold) and +3 (hot), where 0 is an ideal value or temperature representing thermal neutrality. The farther away from zero, in either direction, the less likely an individual will be satisfied by the thermal conditions. Climate control systems may be designed and/or controlled based on the EHT and/or the PMV of thermal comfort.

SUMMARY

A vehicle is provided. The vehicle includes a body structure forming a passenger compartment, and a seat secured to the body structure within the passenger compartment. The seat includes a headrest portion. A sensor system is disposed adjacent to the headrest portion of the seat. The sensor system includes a humidity sensor operable to sense a relative humidity within the passenger compartment adjacent to the headrest portion.

In one embodiment of the vehicle, the sensor system includes the humidity sensor, and a heat flux sensor operable to sense a heat flux within the passenger compartment, adjacent to the headrest portion. The sensor system includes an exterior surface facing a forward end of the passenger compartment, and a temperature sensor operable to sense a temperature of the exterior surface. The sensor system includes a temperature controller operable to maintain the temperature of the surface at a pre-defined temperature. The pre-defined temperature is approximately equal to or greater than thirty four degrees Celsius (34° C.), which is approximately the skin temperature of a human.

In another embodiment of the vehicle, the sensor system includes the humidity sensor, and an air velocity sensor operable to sense an air velocity within the passenger compartment adjacent to the headrest portion, an air temperature sensor operable to sense an air temperature within the passenger compartment adjacent to the headrest portion, and a radiant heat flux sensor operable to sense a radiant heat flux within the passenger compartment adjacent to the headrest portion.

In one aspect of the vehicle, a climate controller is disposed in communication with the sensor system. The climate controller is operable to receive data from the sensor system related to at least one of an air velocity, an air temperature, a radiant heat flux, a heat flux, or a relative humidity, within the passenger compartment adjacent to the headrest portion. The climate controller is operable to calculate a current equivalent homogenous temperature using the data from the sensor system.

In one embodiment of the vehicle, the climate controller is operable to control at least one climate system based on a difference between the current equivalent homogeneous temperature and a desired equivalent homogenous temperature. The climate system(s) is/are in communication with and controlled by the climate controller. The climate system(s) is/are operable to affect a climate within the passenger compartment of the vehicle. The climate system may include an air conditioning system, a heating system, a ventilation system, a sunroof, one or more windows, one or more seat warmers, etc.

In one embodiment of the vehicle, the sensor system includes a single sensor unit housing the air velocity sensor, the air temperature sensor, the radiant heat flux sensor, and the humidity sensor.

In one aspect of the vehicle, the headrest portion of the seat includes a first zone and a second zone. The first zone is defined by an area likely to be covered or blocked by a head of a passenger seated in the seat. The second zone is disposed outside of the first zone, and is defined by an area likely to not be covered or blocked by the head of the passenger seated in the seat. The sensor system is positioned within the second zone of the headrest portion. In another aspect of the vehicle, the sensor system is positioned to face a forward end of the passenger compartment, and is positioned not to be covered or blocked by a head of a passenger seated in the seat.

In one embodiment, the sensor system is supported by the headrest portion of the seat. The sensor system may be incorporated into and integral with the headrest portion of the seat, or may be incorporated into a slip cover and positioned over the headrest portion of the seat.

In one embodiment of the vehicle, the passenger compartment defines multiple zones. Each zone of the passenger compartment includes a respective seat having a headrest portion, and a respective sensor system. The respective sensor system of each respective zone is operable to sense the air velocity within its respective zone of the passenger compartment adjacent the headrest portion of its respective seat, the air temperature within its respective zone of the passenger compartment adjacent the headrest portion of its respective seat, the radiant heat flux within its respective zone of the passenger compartment adjacent the headrest portion of its respective seat, and the relative humidity within its respective zone of the passenger compartment adjacent the headrest portion of its respective seat.

In one embodiment, the vehicle further includes a biometric sensor. The biometric sensor is operable to sense at least one of a skin temperature of a passenger seated in the seat, a blood pressure of the passenger seated in the seat, a pulse rate of the passenger seated in the seat, or a metabolic rate of the passenger seated in the seat.

In one embodiment, the climate controller is disposed in communication with the sensor system and the biometric sensor. The climate controller is operable to receive data from the sensor system related to at least one of the air velocity, the air temperature, the radiant heat flux, the heat flux and the relative humidity, within the passenger compartment adjacent to the headrest portion. The climate controller is operable to receive data from the biometric sensor related to the at least one of the skin temperature of the passenger seated in the seat, the blood pressure of the passenger seated in the seat, the pulse rate of the passenger seated in the seat, or the metabolic rate of the passenger seated in the seat. The climate controller is operable to calculate a current predicted mean vote of thermal comfort using the data from the sensor system and the data from the biometric sensor. In one embodiment of the vehicle, the climate controller is operable to control at least one climate system based on a difference between the current predicted mean vote of thermal comfort and a desired predicted mean vote of thermal comfort.

In one embodiment, the biometric sensor is a wearable article operable to be worn by the passenger. In an alternative embodiment, the biometric sensor may include a fixed article of the vehicle, such as a steering wheel, that is positioned to make contact with the skin of the passenger.

In one aspect of the vehicle, the climate controller includes a processor and a memory having a climate control algorithm saved thereon. The processor is operable to execute the climate control algorithm to calculate a current equivalent homogenous temperature of the seat using data from the sensor system related to at least one of the air velocity, the air temperature, the radiant heat flux, the heat flux, and the relative humidity, within the passenger compartment adjacent to the headrest portion. The climate control algorithm is operable to receive an input defining a desired equivalent homogenous temperature and/or a desired predicted mean vote of thermal comfort, and determine a difference between the current equivalent homogenous temperature and the desired equivalent homogenous temperature, and/or a difference between the current predicted mean vote of thermal comfort and the desired mean vote of thermal comfort. The climate control algorithm may then control the climate system(s) based on the difference between current equivalent homogenous temperature and the desired equivalent homogenous temperature, and/or the difference between the current predicted mean vote of thermal comfort and the desired mean vote of thermal comfort, to achieve the desired equivalent homogenous temperature and/or the desired predicted mean vote of thermal comfort.

A method of controlling a climate control system of a vehicle is also provided. The method includes positioning a sensor system adjacent to a headrest portion of a seat, within a passenger compartment of the vehicle. The sensor system is operable to sense at least one of an air velocity within the passenger compartment adjacent to the headrest portion, an air temperature within the passenger compartment adjacent to the headrest portion, a radiant heat flux within the passenger compartment adjacent to the headrest portion, a heat flux within the passenger compartment adjacent to the headrest portion, or a relative humidity within the passenger compartment adjacent to the headrest portion. Data may then be sensed with the sensor system related to the air velocity, the air temperature, the radiant heat flux, and the relative humidity, within the passenger compartment adjacent to the headrest portion. The sensed data is communicated from the sensor system to a climate controller. The climate controller controls at least one climate system of the vehicle based on the sensed data from the sensor system.

In one aspect of the method of controlling the climate system, the sensor system is positioned near the headrest so that the sensor system faces a forward end of the passenger compartment of the vehicle, and is not covered or blocked by a head of a passenger seated in the seat.

In one embodiment of the method of controlling the climate system, a current equivalent homogenous temperature for a passenger seated in the seat is calculated from the sensed data related to the air velocity, the air temperature, the radiant heat flux, and the relative humidity, within the passenger compartment adjacent to the headrest portion. An input defining a desired equivalent homogenous temperature is received by the climate controller. The climate controller may then control the climate system of the vehicle based on a difference between the current equivalent homogenous temperature and the desired equivalent homogenous temperature.

In one embodiment of the method of controlling the climate system, data related to at least one of a skin temperature of a passenger seated in the seat, a blood pressure of the passenger seated in the seat, a pulse rate of the passenger seated in the seat, or a metabolic rate of the passenger seated in the seat, is sensed with a biometric sensor.

The climate controller may then calculate a current predicted mean vote of thermal comfort from the sensed data from the sensor system related to the air velocity, the air temperature, the radiant heat flux, and the relative humidity, within the passenger compartment adjacent to the headrest portion, and from the sensed data from the biometric sensor related to the at least one of the skin temperature of the passenger seated in the seat, the blood pressure of the passenger seated in the seat, the pulse rate of the passenger seated in the seat, or the metabolic rate of the passenger seated in the seat. An input defining a desired predicted mean vote of thermal comfort is received by the climate controller. The climate controller may then control the climate system of the vehicle based on a difference between the current predicted mean vote of thermal comfort and the desired predicted mean vote of thermal comfort.

In one embodiment, the biometric sensor is a wearable article configured to be worn by the passenger. The method further includes placing the biometric sensor on the passenger in contact with the skin of the passenger.

In one embodiment, the sensor system includes a forward-facing exterior surface. The method of controlling the climate system further includes maintaining a temperature of the exterior surface of the sensor system at a pre-defined temperature. In one embodiment, the pre-defined temperature is equal to or greater than thirty-four degrees Celsius.

Accordingly, positioning the sensor system near the headrest of the seat within the passenger compartment provides an accurate estimation of the equivalent homogenous temperature of a passenger seated in the seat, which the climate controller may use to control the climate system(s) of the vehicle. By incorporating the biometric sensor, the climate controller may factor in the personal factors of the passenger to calculate a current predicted mean vote of thermal comfort of the passenger, and use it to control the climate system(s) of the vehicle. Because the thermal comfort of humans is dependent upon much more than the air temperature, using the equivalent homogenous temperature of the predicted mean vote of thermal comfort to control the climate systems of the vehicle provides more accurate control of the climate systems over a wider variety of conditions, thereby improving the comfort of the passenger.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
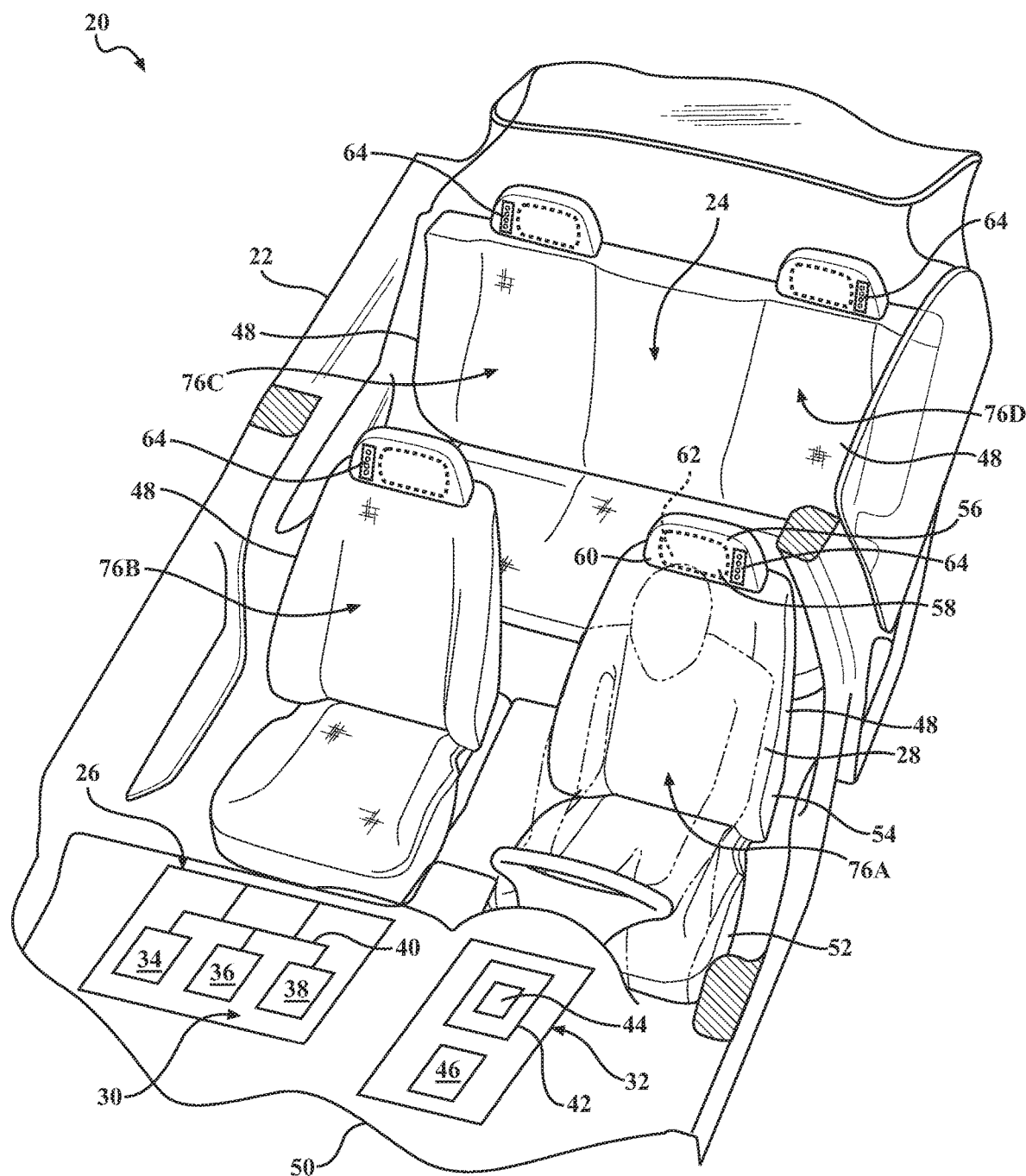
FIG. 1 is a schematic fragmentary perspective view of a vehicle.

Referring to the FIGS., wherein like numerals indicate like parts throughout the several views, a vehicle is generally shown at 20 in FIG. 1. The vehicle 20 may include a form of moveable platform having a climate control system 26. For example, the vehicle 20 may include, but is not limited to, a car, a truck, a van, an SUV, a plane, a train, a boat, a UTV, a tractor, etc.

Referring to FIG. 1, the vehicle 20 includes a body structure 22 forming a passenger compartment 24. The body structure 22 surrounds and generally encapsulates the passenger compartment 24. The body structure 22 may include, but is not limited to, a roof, one or more doors, windows, a floor, etc. The specific shape and configuration of the body structure 22 is not pertinent to the teachings of this disclosure, and are therefore not described in detail herein.

The vehicle 20 includes the climate control system 26 that is operable to affect a climate and/or thermal comfort of a passenger 28 in the passenger compartment 24 of the vehicle 20. The climate control system 26 includes one or more climate systems 30 and a climate controller 32. The climate systems 30 are in communication with and controlled by the climate controller 32. The climate systems 30 may include, but are not to, a heating system 34 for heating the passenger compartment 24, an air conditioning system 36 for cooling the passenger compartment 24, a ventilation system 38 that provides a flow of ambient air to the passenger compartment 24, a system of controllable ductwork 40 that directs and controls the flow of air through the passenger compartment 24, moveable windows and/or a sunroof, controllable window tinting, etc.

The climate controller 32 may be referred to as a control module, a control unit, a computer, a controller, a vehicle 20 controller, etc. The climate controller 32 controls the operation of the climate systems 30 of the vehicle 20. The climate controller 32 may include software, hardware, memory, algorithms, connections, sensors, etc., for managing and controlling the operation of the climate systems 30 of the vehicle 20. As such, a method of controlling the climate systems 30 of the vehicle 20, described below, may be embodied as a program or algorithm operable on the climate controller 32. It should be appreciated that the climate controller 32 may include a device capable of analyzing data from various sensors, comparing data, making the decisions required to control the operation of the climate systems 30, and executing the required tasks to control the operation of the climate systems 30.

The climate controller 32 includes a tangible non-transitory memory 42 having computer executable instructions recorded thereon, including a climate control algorithm 44. The climate controller 32 further includes a processor 46 that is operable to execute the climate control algorithm 44 to implement a method of controlling the climate systems 30 of the vehicle 20.

The climate controller 32 may be embodied as one or multiple digital computers or host machines each having one or more processors 46, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and required input/output (I/O) circuitry, I/O devices, and communication interfaces, as well as signal conditioning and buffer electronics.

The computer-readable memory 42 may include non-transitory/tangible medium which participates in providing data or computer-readable instructions. The memory 42 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or other optical medium, as well as other possible memory devices such as flash memory.

Figure 2:
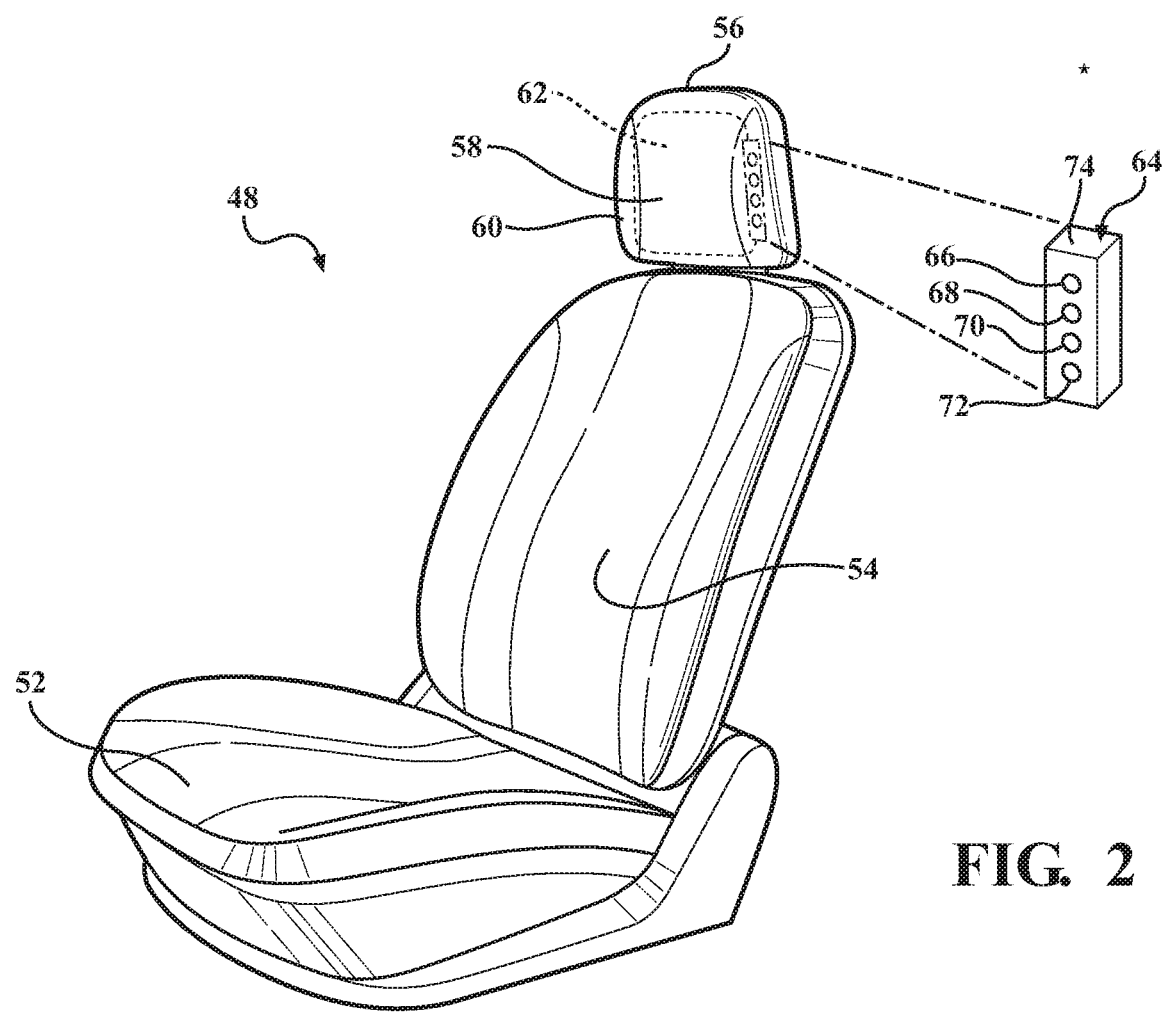
FIG. 2 is a schematic perspective view of a seat showing a sensor system.

Referring to FIG. 1, the vehicle 20 includes a seat 48. The seat 48 is secured to the body structure 22, and is positioned within the passenger compartment 24. The seat 48 is positioned to face a forward end 50 of the vehicle 20 and/or of the passenger compartment 24. Referring to FIG. 2, the seat 48 includes a seat portion 52, a backrest portion 54 attached to and extending generally upward from the seat portion 52, and a headrest portion 56 attached to an upper end of the backrest portion 54. The headrest portion 56 includes a first zone 58 and a second zone 60. The first zone 58 and the second zone 60 are disposed on a forward-facing surface 62 of the headrest portion 56 of the seat 48, i.e. on a surface of the headrest portion 56 that faces the forward end 50 of the vehicle 20. The first zone 58 is defined by an area likely to be covered or blocked by a head of the passenger 28 when the passenger 28 is seated in the seat 48. The second zone 60 is disposed outside of the first zone 58, and is defined by an area likely to not be covered or blocked by the head of the passenger 28 seated in the seat 48. As such, the first zone 58 may be considered the center or central region of the forward-facing surface 62 of the headrest portion 56, whereas the second zone 60 may be considered the outer or peripheral region of the forward-facing surface 62 of the headrest portion 56. It should be appreciated that the vehicle 20 may include more than one seat 48 described herein. For example, referring to FIG. 1, the vehicle 20 includes two front seats 48, and a single, bench style rear seat 48. It should be appreciated that the vehicle 20 may include more or less than the number of seats 48 shown in the exemplary embodiment of FIG. 1.

Referring to FIG. 2, the vehicle 20 further includes a sensor system 64. The sensor system 64 is disposed or positioned adjacent to the headrest portion 56 of the seat 48. More specifically, the sensor system 64 is disposed within the second zone 60 of the headrest portion 56. The sensor system 64 is positioned to face the forward end 50 of the vehicle 20, and is positioned not to be covered or blocked by a head of a passenger 28 seated in the seat 48.

As shown in FIG. 2, the sensor system 64 includes an air velocity sensor 66, an air temperature sensor 68, a radiant heat flux sensor 70, and a humidity sensor 72. The air velocity sensor 66 is operable to sense an air velocity within the passenger compartment 24, adjacent to the first zone 58 of the headrest portion 56. The air temperature sensor 68 is operable to sense an air temperature within the passenger compartment 24, adjacent to the first zone 58 of the headrest portion 56. The radiant heat flux sensor 70 is operable to sense a radiant heat flux within the passenger compartment 24, adjacent to the first zone 58 of the headrest portion 56. The humidity sensor 72 is operable to sense a relative humidity within the passenger compartment 24, adjacent to the first zone 58 of the headrest portion 56. As used herein, the "radiant heat flux" is defined as a flow of radiant heat energy per unit of area per unit of time. It has both a direction and a magnitude, and so it is a vector quantity. The radiant heat energy may come from, but is not limited to, solar energy through one or more windows of the vehicle 20.

Figure 5:
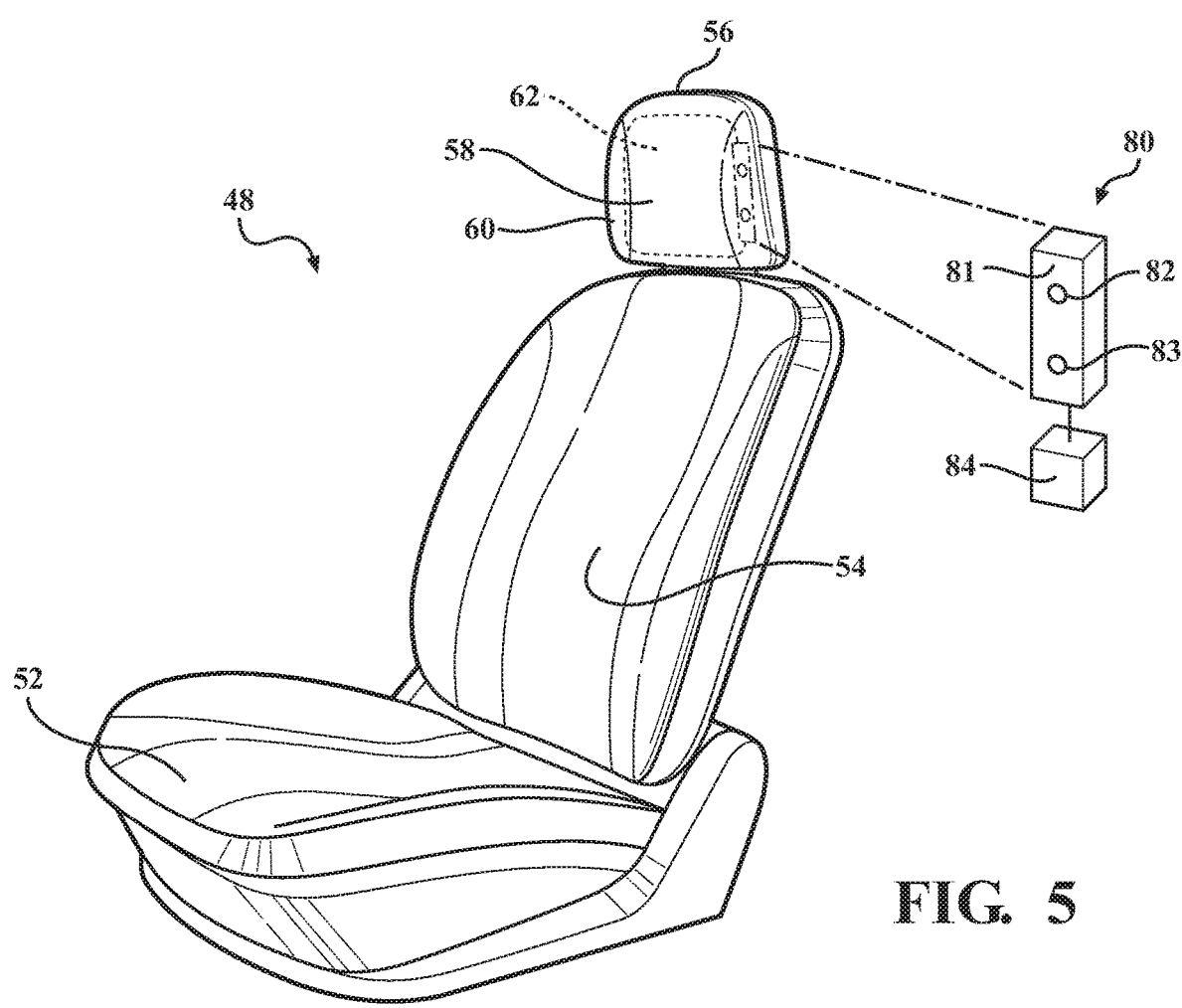
FIG. 5 is a schematic perspective view of the seat showing an alternative embodiment of the sensor system.

Referring to FIG. 5, an alternative embodiment of the sensor system is generally shown at 80. The sensor system 80 is a heat flux sensor. As used herein, the term "heat flux" is defined as a flow of energy per unit of area per unit of time. The heat flux sensor system 80 includes an exterior surface 81. The exterior surface 81 of the sensor system 80 faces the forward end 50 of the passenger compartment 24. The sensor system 80 includes a temperature sensor 82 that is operable to sense the surface temperature of the exterior surface 81 of the sensor system 80. The sensor system 80 further includes a humidity sensor 82. The humidity sensor 82 is operable to sense the relative humidity within the passenger compartment 24, adjacent to the first zone 58 of the headrest portion 56. The sensor system 80 includes a temperature controller that is operable to maintain the temperature of the exterior surface 81 at a pre-defined temperature. The temperature controller may include, but is not limited to, a thermo-electric material that can provide both heating and cooling in response to a power supply. The power supply is adjusted by the climate controller 32 to maintain the pre-defined temperature. The pre-defined temperature is approximately equal to the body surface temperature of a human, e.g., approximately thirty-four degrees Celsius (34° C.). The magnitude of the electric power supply to maintain the temperature of the exterior surface 81 is approximately equal to the heat flux from the sensor system 80.

In one exemplary embodiment, the sensor system 64, 80 includes a single sensor housing 74 that includes the air velocity sensor 66, the air temperature sensor 68, the radiant heat flux sensor 70, and the humidity sensor 72. In other embodiments, the air velocity sensor 66, the air temperature sensor 68, the radiant heat flux sensor 70, and the humidity sensor 72 may be individual and separate from each other, and not combined into the single sensor housing 74.

In one embodiment, the sensor system 64, 80 may be supported by a component of the vehicle 20 other than the seat 48, and positioned adjacent the headrest portion 56. In other embodiments, the sensor system 64, 80 is supported by the headrest portion 56 of the seat 48. For example, in one embodiment, such as shown in FIG. 2, the sensor system 64, 80 may be incorporated into and integral with the headrest portion 56 of the seat 48. In other embodiments, the sensor system 64, 80 may be incorporated into a seat 48 cover (not shown) or other structure, and slideably disposed over or otherwise attached to the headrest portion 56 of the seat 48.

As shown in FIG. 1, the passenger compartment 24 may define multiple climate zones 76A, 76B, 76C, 76D. Each climate zone of the passenger compartment 24 includes a respective seat 48 having a headrest portion 56 and a respective sensor system 64, 80 operable to sense the air velocity within its respective climate zone of the passenger compartment 24 adjacent the headrest portion 56 of its respective seat 48, the air temperature within its respective climate zone of the passenger compartment 24 adjacent the headrest portion 56 of its respective seat 48, the radiant heat flux within its respective climate zone of the passenger compartment 24 adjacent the headrest portion 56 of its respective seat 48, and the relative humidity within its respective climate zone of the passenger compartment 24 adjacent the headrest portion 56 of its respective seat 48. For example, as shown in FIG. 1, the vehicle 20 includes four climate zones 76A, 76B, 76C, 76D. The climate controller 32 may control the climate systems 30 for each climate zone 76A, 76B, 76C, 76D independently, to provide a different thermal comfort for each respective climate zone 76A, 76B, 76C, 76D. While the exemplary embodiments shown in FIG. 1 includes four climate zones 76A, 76B, 76C, 76D, it should be appreciated that the vehicle 20 may include more or less then the exemplary four climate zones 76A, 76B, 76C, 76D. Furthermore, while the process described below refers to a single seat 48 and a respective sensor system 64, 80, it should be appreciated that the process described below is the same for each of the respective climate zones 76A, 76B, 76C, 76D.

Figure 3:
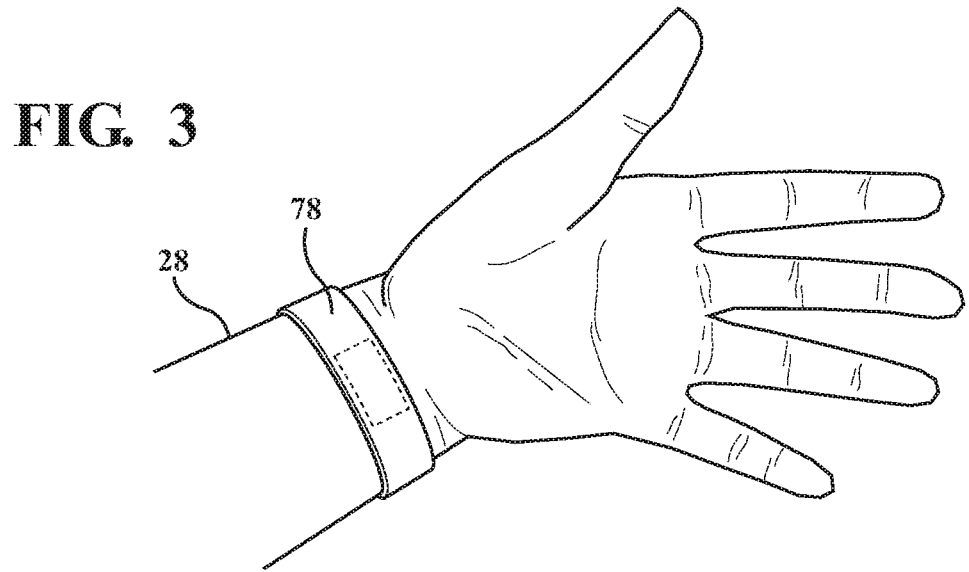
FIG. 3 is schematic perspective view of a biometric sensor on a passenger of the vehicle.

Referring to FIG. 3, the vehicle 20 may further include a biometric sensor 78 for each climate zone 76A, 76B, 76C, 76D of the vehicle 20. The biometric sensor 78 is operable to sense at least one of a skin temperature of the passenger 28 seated in the seat 48, a blood pressure of the passenger 28 seated in the seat 48, a pulse rate of the passenger 28 seated in the seat 48, or a metabolic rate of the passenger 28 seated in the seat 48. In one exemplary embodiment, such as shown in FIG. 3, the biometric sensor 78 is a wearable article operable to be worn by the passenger 28 next to the skin of the passenger 28. In other embodiments, the biometric sensor 78 is integrated into a fixed article of the vehicle 20, such as but not limited to a steering wheel of the vehicle 20, and positioned to contact the skin of the passenger 28 when the passenger 28 is seated in the seat 48.

The climate controller 32 is disposed in communication with the sensor system 64, 80, and operable to receive data from the sensor system 64, 80 related to at least one of the air velocity, the air temperature, the radiant heat flux, the relative humidity, within the passenger compartment 24 adjacent to the first zone 58 of the headrest portion 56 of the seat 48. Additionally, if equipped with the biometric sensor 78, the climate controller 32 is also disposed in communication with the biometric sensor 78, and operable to receive data from the biometric sensor 78 related to at least one of the skin temperature of the passenger 28 seated in the seat 48, the blood pressure of the passenger 28 seated in the seat 48, the pulse rate of the passenger 28 seated in the seat 48, or the metabolic rate of the passenger 28 seated in the seat 48.

Figure 4:
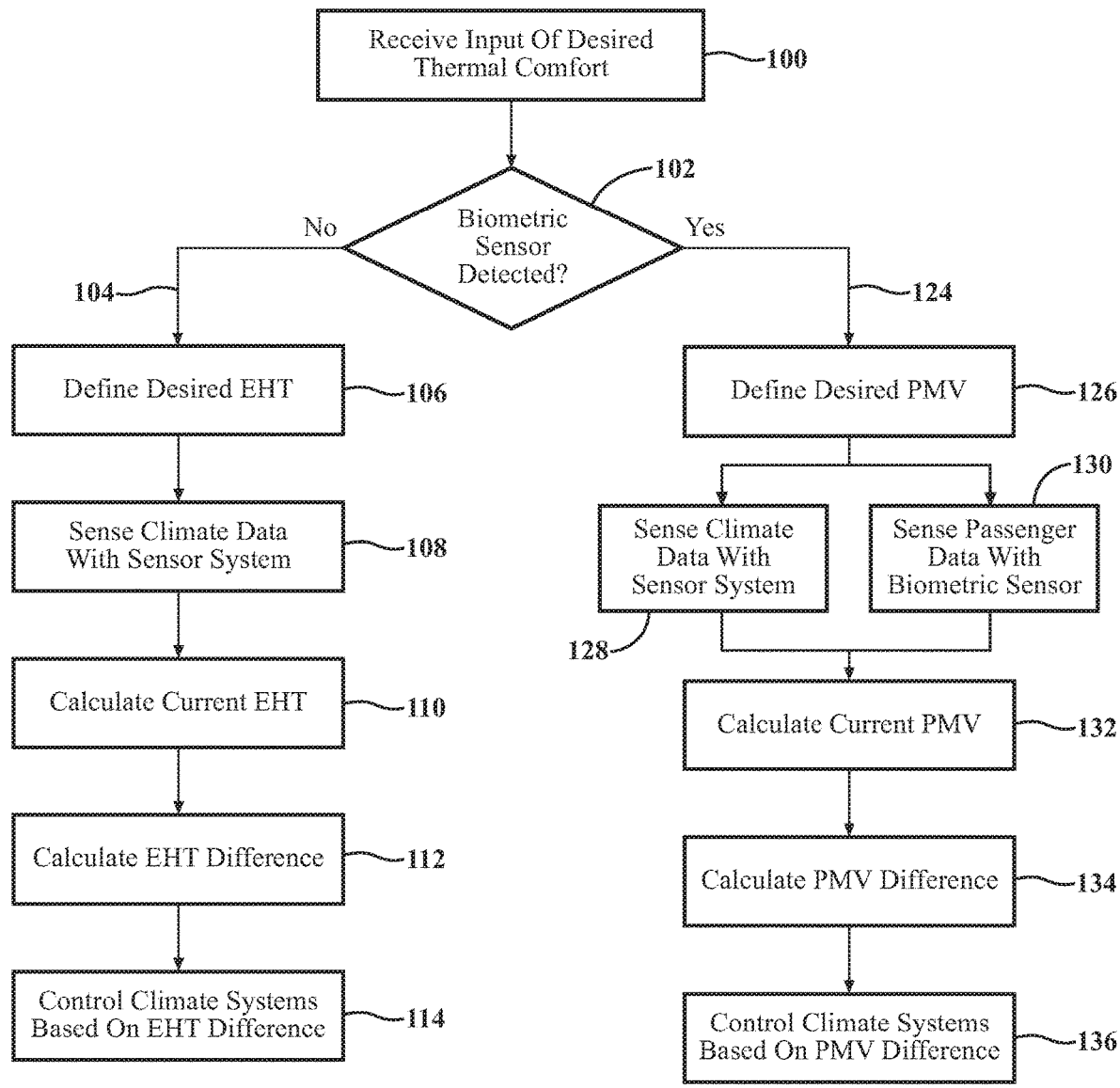
FIG. 4 is a flowchart representing a method of controlling a climate control system of the vehicle.

As noted above, the climate controller 32 executes the climate control algorithm 44 to implement the method of controlling the climate systems 30 of the vehicle 20. Referring to FIG. 4, the climate controller 32 may receive an input, from the passenger 28, regarding a desired thermal comfort level, or otherwise define a desired thermal comfort level automatically based on pre-programmed settings. The step of receiving the input for a desired thermal comfort level is generally indicated by box 100 in FIG. 4. The climate controller 32 may then determine if the biometric sensor 78 is connected and operational, or if the biometric sensor 78 is not connected and/or is not operational. The step of determining if the biometric sensor 78 is operable is generally indicated by box 102 in FIG. 4. If the climate controller 32 is unable to connect and communicate with the biometric sensor 78, and/or the biometric sensor 78 is not communicating data related to the passenger 28, then the climate controller 32 may provide an alert or notification to the passenger 28 requesting that the passenger 28 position the biometric sensor 78 in contact with the skin of the passenger 28, or otherwise make a proper connection with the biometric sensor 78. If the climate controller 32 is still unable to communicate with the biometric sensor 78, or the vehicle 20 is not equipped with a biometric sensor 78, then the climate controller 32 may proceed without the biometric sensor 78, using just the sensor system 64, 80.

When the biometric sensor 78 is unavailable, generally indicated at 104, then the climate controller 32 uses the received input regarding the desired thermal comfort level to define a desired Equivalent Homogenous Temperature (EHT). The step of defining the desired EHT is generally indicated by box 106 in FIG. 4. The desired EHT represents the thermal condition desired to be perceived by the passenger 28. The desired EHT incorporates several different factors that affect the thermal comfort of the passenger 28, and combine them into a single temperature value. Accordingly, the desired EHT is not simply a desired air temperature, but instead represents the desired thermal effect that is perceived by the passenger 28. The climate controller 32 may define the desired EHT from the input in a suitable manner. The input may be in different forms, such as a requested temperature, e.g., 72 degrees F., a relative temperature setting, e.g., a dial that moves between "hot" and "cold", etc. The manner in which the climate controller 32 defines the desired EHT is dependent upon the specific manner in which the desired thermal comfort level is input.

In one embodiment, using the sensor system 64 shown in FIG. 2, the sensor system 64 senses data related to the climate within the passenger compartment 24 adjacent the first zone 58 of the headrest portion 56 of the seat 48. The step of sensing climate data with the sensor system 64 is generally indicated by box 108 in FIG. 4. It has been discovered that positioning the sensor system 64 adjacent the first zone 58 of the headrest portion 56 to sense the climate conditions at that location relative to the passenger 28 seated in the seat 48 provides data that accurately represents the perceived thermal effect on the passenger 28. As noted above, the embodiment of the sensor system 64 shown in FIG. 2 includes the air velocity sensor 66, the air temperature sensor 68, the radiant heat flux sensor 70, and the humidity sensor 72. The air velocity sensor 66 senses the air velocity within the passenger compartment 24, adjacent to the first zone 58 of the headrest portion 56. The air temperature sensor 68 senses the air temperature within the passenger compartment 24, adjacent to the first zone 58 of the headrest portion 56. The radiant heat flux sensor 70 senses the radiant heat flux within the passenger compartment 24, adjacent to the first zone 58 of the headrest portion 56. The humidity sensor 72 senses the relative humidity within the passenger compartment 24, adjacent to the first zone 58 of the headrest portion 56.

In another embodiment, using the sensor system 80 shown in FIG. 5, the humidity sensor 83 senses the relative humidity within the passenger compartment 24, adjacent to the first zone 58 of the headrest portion 56. The temperature sensor 82 senses the temperature of the exterior surface 81 within the passenger compartment 24, adjacent to the first zone 58 of the headrest portion 56. The temperature controller 84 supplies an electric current or power supply to the sensor system 80 to maintain the temperature of the exterior surface 81 at a temperature that is approximately equal to a body surface temperature of a human. The temperature controller 84 controls the electric current based on the sensed temperature of the exterior surface 81. The sensor system 80 measures the total heat flux directly based on the amount of electric power supplied to the sensor system 80 to maintain the surface temperature of the exterior surface 81.

The climate controller 32 then calculates a current EHT using the sensed data from the sensor system 64, 80. The step of calculating the current EHT is generally indicated by box 110 in FIG. 4. The current EHT is an estimate of the current thermal conditions perceived by the passenger 28 seated in the seat 48. The climate controller 32 may calculate the current EHT in a suitable manner. The process of calculating the current EHT using the air velocity, the air temperature, the radiant heat flux, and the relative humidity, from the sensor system 64 shown in FIG. 2 is understood by those in the art, and is therefore not described in detail herein. Additionally, the process of calculating the current EHT using the total heat flux and the relative humidity from the sensor system 80 shown in FIG. 5 is understood by those skilled in the art, and is therefore not described in detail herein.

The climate controller 32 may then determine a difference between the current EHT and the desired EHT. The step of calculating the difference between the current EHT and the desired EHT is generally indicated by box 112 in FIG. 4. As noted above, the current EHT is an estimate of the current thermal conditions perceived by the passenger 28 seated in the seat 48, whereas the desired EHT is an estimate of thermal conditions needed to provide the desired perceived level of thermal comfort by the passenger 28. The climate controller 32 may calculate the difference between the current EHT and the desired EHT in a suitable manner, such as but not limited to calculating a numerical difference between the current EHT and the desired EHT.

Once the difference between the current EHT and the desired EHT has been calculated, the climate controller 32 may then control climate systems 30 of the vehicle 20, based on the difference between the current EHT and the desired EHT, to achieve the desired EHT. The step of controlling the climate systems 30 is generally indicated by box 114 in FIG. 4. For example, the climate controller 32 may engage the air conditioning system 36, engage the heating system 34, open or close the ventilation system 38, control the duct system to direct air flow directly toward the passenger 28, control the duct system to direct air flow toward the feet of the passenger 28, etc.

When the biometric sensor 78 is available, generally indicated at 124, then the climate controller 32 uses the received input regarding the desired thermal comfort level to define a desired Predicted Mean Vote (PMV) of thermal comfort. The step of defining the PMV of thermal comfort is generally indicated by box 126 in FIG. 4. The PMV of thermal comfort is an empirical fit to the human sensation of thermal comfort that predicts the average vote of a large group of people on a seven point thermal sensation scale between −3 (cold) and +3 (hot), where 0 is an ideal value or temperature representing thermal neutrality. The farther away from zero, in either direction, the less likely an individual will be satisfied by the thermal conditions. The PMV of thermal comfort considers the same factors as the EHT, but also includes factors that are personal to the passenger 28, such as but not limited to, a skin temperature of the passenger 28, a blood pressure of the passenger 28, a pulse rate of the passenger 28, or a metabolic rate of the passenger 28. The EHT is combined with the personal factors of the passenger 28 to define the PMV.

The desired PMV of thermal comfort may be defined in a suitable manner, based on the input regarding the desired thermal comfort level of the passenger 28. As noted above, the input regarding the requested thermal comfort level of the passenger 28 may be in different forms, such as a specific requested temperature, or a relative temperature setting. The manner in which the climate controller 32 defines the desired PMV of thermal comfort based on the received input of requested thermal comfort is dependent upon the specific form of the input.

The sensor system 64, 80 senses data related to the climate within the passenger compartment 24 adjacent the first zone 58 of the headrest portion 56 of the seat 48. The step of sensing climate data with the sensor system 64, 80 is generally indicated by box 128 in FIG. 4. As noted above, the sensor system 64, 80 senses at least one of the air velocity, the air temperature, the radiant heat flux, the heat flux and the relative humidity. Additionally, the biometric sensor 78 senses data related to at least one of the skin temperature of the passenger 28, the blood pressure of the passenger 28 seated, the pulse rate of the passenger 28, or the metabolic rate of the passenger 28. The step of sensing passenger 28 data with the biometric sensor 78 is generally indicated by box 130 in FIG. 4. The data from the sensor system 64, 80 and the biometric sensor 78 is communicated to the climate controller 32.

The climate controller 32 may then calculate a current PMV of thermal comfort using the data from the sensor system 64, 80 and the data from the biometric sensor 78. The step of calculating the current PMV of thermal comfort is generally indicated by box 132 in FIG. 4. Specifically, the climate controller 32 calculates the current PMV of thermal comfort from the air velocity, the air temperature, the radiant heat flux, and the relative humidity, within the passenger compartment 24 adjacent to the first zone 58 of the headrest portion 56, and from the sensed data from the biometric sensor 78 related to the skin temperature of the passenger 28, the blood pressure of the passenger 28, the pulse rate of the passenger 28, and/or the metabolic rate of the passenger 28.

The current PMV of thermal comfort is an estimate of the current PMV of thermal comfort of the passenger 28 seated in the seat 48. The climate controller 32 may calculate the current PMV of thermal comfort in a suitable manner. The process of calculating the current PMV of thermal comfort using the air velocity, the air temperature, the radiant heat flux, the relative humidity, with the personal factors of the passenger 28, such as the skin temperature, the blood pressure, the pulse rate, and/or the metabolic rate of the passenger 28, is understood by those in the art, and is therefore not described in detail herein.

The climate controller 32 may then determine a difference between the current PMV of thermal comfort and the desired PMV of thermal comfort. The step of calculating the difference between the current PMV of thermal comfort and the desired PMV of thermal comfort is generally indicated by box 134 in FIG. 4. As noted above, the current PMV of thermal comfort is an estimate of the the current PMV of thermal comfort of the passenger 28 seated in the seat 48, whereas the desired PMV of thermal comfort is an estimate of the desired PMV of thermal comfort of the passenger 28. The climate controller 32 may calculate the difference between the current PMV of thermal comfort and the desired PPMV of thermal comfort in a suitable manner, such as but not limited to calculating a numerical difference between the current PMV of thermal comfort and the desired PMV of thermal comfort.

Once the difference between the current PMV of thermal comfort and the desired PMV of thermal comfort has been calculated, the climate controller 32 may then control climate systems 30 of the vehicle 20, based on the difference between the current PMV of thermal comfort and the desired PMV of thermal comfort, to achieve the desired PMV of thermal comfort. The step of controlling the climate systems 30 based on the PMV difference is generally indicated by box 136 in FIG. 4. For example, the climate controller 32 may engage the air conditioning system 36, engage the heating system 34, open or close the ventilation system 38, control the duct system to direct air flow directly toward the passenger 28, control the duct system to direct air flow toward the feet of the passenger 28, etc.

Perceived thermal comfort of a passenger 28 is very individualized. A first person may perceive a specific air temperature as hot, whereas a second person may perceive the same specific air temperature as cold. Additionally, perceived thermal conditions are dependent upon much more than air temperature. Because the process described herein uses the EHT or the PMV of thermal comfort to control the climate systems 30 of the vehicle 20, which incorporate several different factors that affect how the passenger 28 perceives the climate within the passenger compartment 24 of the vehicle 20, the process described herein improves climate control management for the passenger 28.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A vehicle climate control system comprising:
a body structure forming a passenger compartment;
a seat secured to the body structure within the passenger compartment, and having a headrest portion;
a sensor system disposed adjacent to the headrest portion of the seat, and having a humidity sensor operable to sense a relative humidity within the passenger compartment adjacent to the headrest portion;
a biometric sensor;
a climate system; and a climate controller, in communication with the sensor system and the biometric sensor, and operable to control the climate system;

wherein the climate controller is operable to calculate a current equivalent homogenous temperature using data from the sensor system;

wherein the climate controller is operable to calculate a current predicted mean vote of thermal comfort using the data from the sensor system and data from the biometric sensor;

wherein the climate controller is operable to control the climate system in response to the current equivalent homogenous temperature when the climate controller is unable to communicate with the biometric sensor; and wherein the climate controller is operable to control the climate system in response to the current predicted mean vote of thermal comfort when the climate controller is able to communicate with the biometric sensor.

2. The vehicle climate control system set forth in claim 1, wherein the sensor system includes a heat flux sensor operable to sense a heat flux within the passenger compartment adjacent to the headrest portion.

3. The vehicle climate control system set forth in claim 2, wherein the sensor system includes an exterior surface facing a forward end of the passenger compartment, and a temperature sensor operable to sense a temperature of the exterior surface.

4. The vehicle climate control system set forth in claim 3, wherein the sensor system includes a temperature controller operable to maintain the temperature of the exterior surface at a pre-defined temperature.

5. The vehicle climate control system set forth in claim 4, wherein the pre-defined temperature is equal to or greater than thirty four degrees Celsius (34° C.).

6. The vehicle climate control system set forth in claim 1, wherein the sensor system includes an air velocity sensor operable to sense an air velocity within the passenger compartment adjacent to the headrest portion, an air temperature sensor operable to sense an air temperature within the passenger compartment adjacent to the headrest portion, and a radiant heat flux sensor operable to sense a radiant heat flux within the passenger compartment adjacent to the headrest portion.

7. The vehicle climate control system set forth in claim 1, wherein the climate controller is in communication with the sensor system, and operable to receive the data from the sensor system, wherein the data from the sensor system is related to at least one of an air velocity, an air temperature, a radiant heat flux, a heat flux, or the relative humidity within the passenger compartment adjacent to the headrest portion.

8. The vehicle climate control system set forth in claim 7, wherein the climate controller is operable to control the climate system based on a difference between the current equivalent homogeneous temperature and a desired equivalent homogenous temperature when the climate controller is unable to communicate with the biometric sensor.

9. The vehicle climate control system set forth in claim 1, wherein the headrest portion of the seat includes a first zone defined by an area likely to be covered or blocked by a head of a passenger seated in the seat, and a second zone disposed outside of the first zone and defined by an area likely to not be covered or blocked by the head of the passenger seated in the seat, with the sensor system positioned within the second zone of the headrest portion.

10. The vehicle climate control system set forth in claim 1, wherein the sensor system is positioned to face a forward end of the passenger compartment, and is positioned not to be covered or blocked by a head of a passenger seated in the seat.

11. The vehicle climate control system set forth in claim 1, wherein the sensor system is supported by the headrest portion of the seat.

12. The vehicle climate control system set forth in claim 1, wherein the passenger compartment defines multiple zones, with each zone of the passenger compartment including a respective seat having a headrest portion and a respective sensor system operable to sense at least one of an air velocity within its respective zone of the passenger compartment adjacent the headrest portion of its respective seat, an air temperature within its respective zone of the passenger compartment adjacent the headrest portion of its respective seat, a radiant heat flux within its respective zone of the passenger compartment adjacent the headrest portion of its respective seat, a heat flux within its respective zone of the passenger compartment adjacent the headrest portion of its respective seat, or the relative humidity within its respective zone of the passenger compartment adjacent the headrest portion of its respective seat.

13. The vehicle climate control system set forth in claim 1, wherein the biometric sensor is operable to sense at least one of a skin temperature of a passenger seated in the seat, a blood pressure of the passenger seated in the seat, a pulse rate of the passenger seated in the seat, or a metabolic rate of the passenger seated in the seat.

14. The vehicle climate control system set forth in claim 1, wherein the climate controller is operable to control the climate system based on a difference between the current predicted mean vote of thermal comfort and a desired predicted mean vote of thermal comfort when the climate controller is able to communicate with the biometric sensor.

15. A method of controlling a climate control system of a vehicle, the method comprising:

positioning a sensor system adjacent a headrest portion of a seat within a passenger compartment of the vehicle, wherein the sensor system is operable to sense at least one of an air velocity within the passenger compartment adjacent to the headrest portion, an air temperature within the passenger compartment adjacent to the headrest portion, a radiant heat flux within the passenger compartment adjacent to the headrest portion, a heat flux within the passenger compartment adjacent to the headrest portion, or a relative humidity within the passenger compartment adjacent to the headrest portion;

monitoring, via a biometric sensor, biometric data for a passenger;

sensing data with the sensor system related to at least one of the air velocity, the air temperature, the radiant heat flux, the heat flux, or the relative humidity, within the passenger compartment adjacent to the headrest portion;

communicating the sensed data from the sensor system and the biometric data for the passenger to a climate controller;

determining a current equivalent homogenous temperature using the data from the sensor system;

determining a current predicted mean vote of thermal comfort using the data from the sensor system and the biometric data from the biometric sensor;

controlling, via the climate controller, a climate system in response to the current equivalent homogenous temperature when the climate controller is unable to communicate with the biometric sensor; and controlling, via the climate controller, the climate system in response to the current predicted mean vote of thermal comfort when the climate controller is able to communicate with the biometric sensor.

16. The method set forth in claim 15, wherein positioning the sensor system adjacent the headrest portion of the seat within the passenger compartment includes positioning the sensor system near the headrest so that the sensor system faces a forward end of the passenger compartment of the vehicle and is not covered or blocked by a head of a passenger seated in the seat.

17. The method set forth in claim 15, further comprising:

determining the current equivalent homogenous temperature for a passenger seated in the seat from the sensed data related to at least one of the air velocity, the air temperature, the radiant heat flux, the heat flux, or the relative humidity, within the passenger compartment adjacent to the headrest portion;

receiving an input defining a desired equivalent homogenous temperature; and wherein controlling the climate system of the vehicle based on the sensed data from the sensor system is further defined as controlling the climate system of the vehicle based on a difference between the current equivalent homogenous temperature and the desired equivalent homogenous temperature.

18. The method set forth in claim 17, further comprising:

wherein monitoring, via the biometric sensor, biometric data for the passenger comprises sensing data related to at least one of a skin temperature of a passenger seated in the seat, a blood pressure of the passenger seated in the seat, a pulse rate of the passenger seated in the seat, or a metabolic rate of the passenger seated in the seat;

determining the current predicted mean vote of thermal comfort from the sensed data from the sensor system related to the air velocity, the air temperature, the radiant heat flux, and the relative humidity, within the passenger compartment adjacent to the headrest portion, and the biometric data for the passenger;

receiving an input defining a desired predicted mean vote of thermal comfort; and wherein controlling the climate system of the vehicle based on the sensed data from the sensor system is further defined as controlling the climate system of the vehicle based on a difference between the current predicted mean vote of thermal comfort and the desired predicted mean vote of thermal comfort.

19. The method set forth in claim 15, further comprising maintaining a forward facing exterior surface of the sensor system at a constant temperature equal to or greater than thirty four degrees Celsius (34° C.).

* * * * *